J. W. YORK.
Fertilizers.

No. 137,586.

2 Sheets--Sheet 1.

Patented April 8, 1873.

2 Sheets—Sheet 2.

J. W. YORK.
Fertilizers.

No. 137,586. Patented April 8, 1873.

Witnesses.
James G. Miner
Robert M. Fryer

Inventor.
John W. York

UNITED STATES PATENT OFFICE.

JOHN W. YORK, OF NOLENSVILLE, TENNESSEE, ASSIGNOR OF ONE-HALF HIS RIGHT TO GEORGE W. MORTON, JOSEPH H. MURRAY, AND THOMAS B. TAYLOR, OF SAME PLACE.

IMPROVEMENT IN FERTILIZERS.

Specification forming part of Letters Patent No. 137,586, dated April 8, 1873; application filed August 3, 1872.

*To all whom it may concern:*

Be it known that I, JOHN W. YORK, of Nolensville, in the county of Williamson and State of Tennessee, have invented a new and Improved Implement for Sowing or Distributing Fertilizers, &c., of which the following is a specification:

Nature and Object.

The object of my invention is to produce an implement by means of which nearly every kind of manure or fertilizer can be sown or distributed in a continuous drill, or dropped in spots or hills, to suit the requirements of the case. By the use of such an implement a small amount of manure can be made to go a great way, (or, in other words, the fertilizers can be most economically used,) as the same can be placed in the precise spot where it is required to increase the crop; whereas, in sowing the same broadcast, as much of the useful properties of the fertilizers is expended in the production of useless weeds growing between the hills or drills as there is in the nourishment of the contents of the same. The nature of my invention consists in the combination of a running-gear, (to be operated or propelled by animal power,) a grinding apparatus, and an automatic feeding apparatus, all of which are arranged at the bottom of a hopper.

In order, however, to thoroughly describe my implement, that its novelty and usefulness may be observed, I will at once proceed with the general description, having reference to the accompanying drawing, in which—

Figure 1:
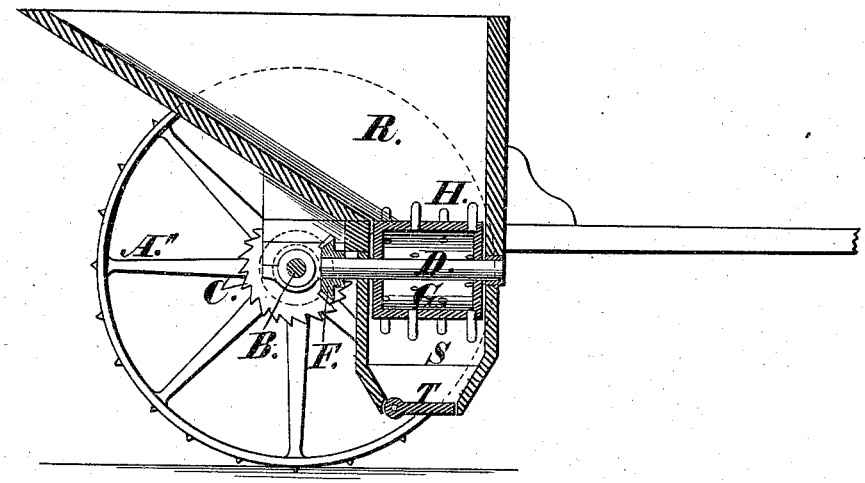
Figure 2:
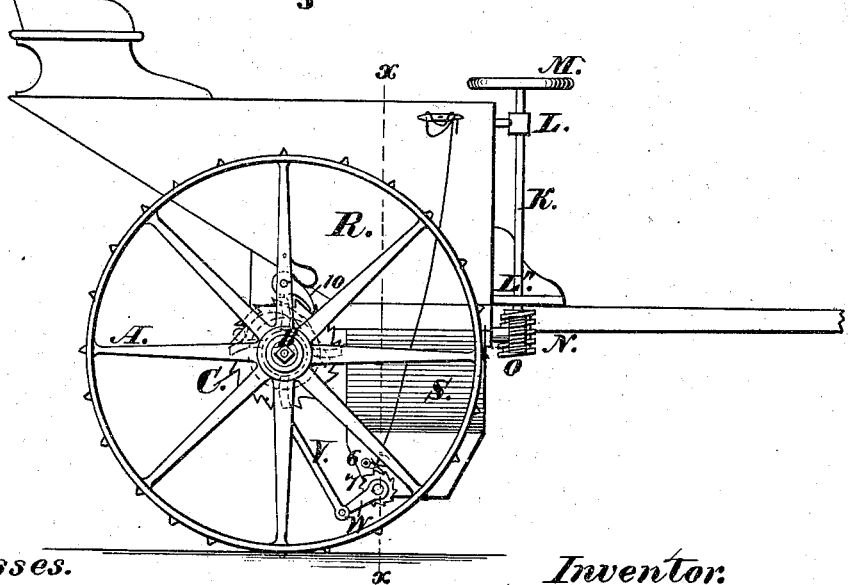
Figure 3:
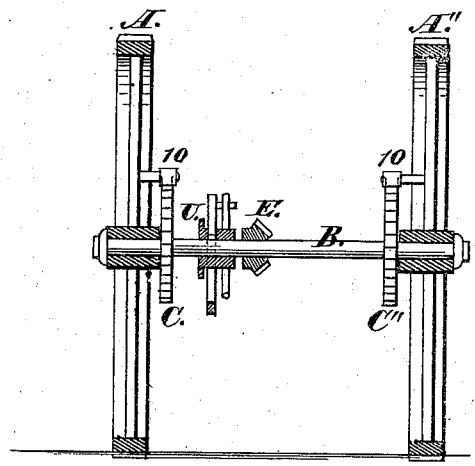
Figure 4:
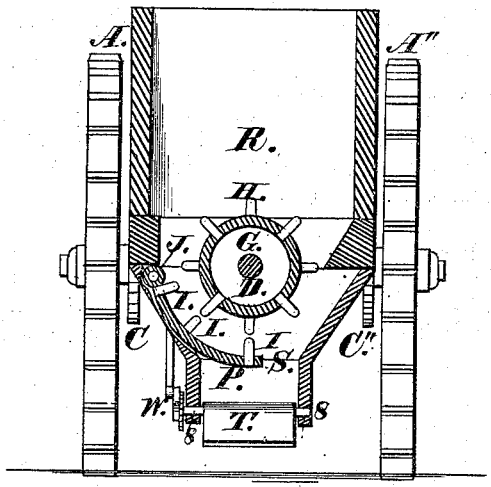
Figure 5:
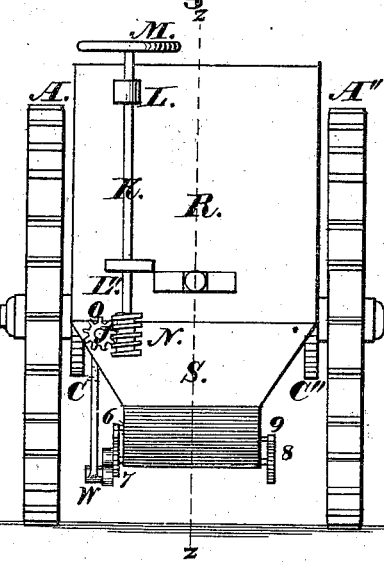
Figure 6:
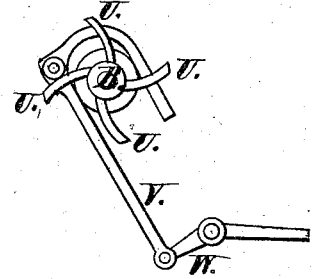

Figure 1 represents a vertical section through the lines Z Z, Fig. 5. Fig. 2 represents a side elevation. Fig. 3 represents a vertical and lateral section of driving-wheels, shaft, and connections. Fig. 4 represents a vertical section through line X X, Fig. 2. Fig. 5 represents a front elevation. Fig. 6 represents cams U, connecting-rod V, and crank W.

General Description.

A A'' are the wheels, upon which the implement is supported by means of an axle-tree, B, which is made to revolve in the direction of arrow by the rotation of either of the said wheels, but does not revolve when either or both wheels revolve backward. This action is controlled by the use of the ratchet-wheels C C'', attached to shaft B, and the pawl upon wheels A A'', as shown in Figs. 2 and 3 of my drawing. D is a shaft, situated at right angles with shaft B, and connected therewith by means of bevel-gear wheels E F, so that the rotation of shaft B produces rotary motion of the shaft D, which is provided with a cylinder, G, having a number of knives or teeth, H, corresponding with similar teeth I attached to the inner surface of a segment of a circle, P, which is suspended at the top by shaft J, while the lower end is allowed to vibrate, by which means the space between this and cylinder G may be varied at pleasure; and for this purpose shaft K is arranged, by means of boxes L L'', to revolve while it is held in a vertical position. Said shaft K is provided at the top with a hand-wheel, M, by which the same may be revolved, and at the bottom with a worm-wheel, N, acting in connection with a pinion, O, which is attached to shaft J. By this means the segment P may be placed and held in any desired practical position. R is the hopper, at the bottom of which is attached box S, forming a passage leading from cylinder G to within a short distance from the ground. This passage is automatically opened and closed by a valve, T, which is made to vibrate in an opening direction by means of the cams U, attached to revolving shaft D, and the connecting-rod V and crank, as shown in Figs. 2 and 6; and the closing motion is caused by a spring, 9, in connection with shaft 8, as shown in Fig. 5. The object in causing the said valve to close by means of said spring, and not by other means, is, first, to avoid the breaking of any of the parts in case of the presence of an obstruction in said passage; and, in the second place, by lifting the connecting-rod sufficiently to clear the cams, and leaving it so that the passage at S is left open for any desired time; and for this purpose is arranged the spring-pawl 6 upon the side of box S, to act in connection with ratchet 7, which is attached to the valve-shaft 8. To the pawl 6 is connected a cord or wire, leading to within easy reach of the operator of the implement, by means of which said pawl may be lifted from the ratchet-wheel, when the said valve will act as aforesaid, though by letting the cord or wire loose the pawl will fall into the ratchet-wheel; and, consequently, after the first revolution of shaft D the valve T will remain open, and in this position the contents of the hopper are allowed to fall in a continuous drill; and, on the contrary, when said valve is in operation the contents of said hopper are only permitted to fall when the cam opens the valve, which may be as often as desired, by the proper construction of said cams.

Operation.

Supposing the hopper to be filled with the desired fertilizer, the pawls 10 upon the driving-wheels A A″ are thrown out of gear with the shaft B, so that the same will not revolve until the implement is located in the desired spot for operation, when said pawls may be let fall in the ratchet-wheels upon shaft B, when the same will revolve in proportion to the forward progress of the implement. This revolves the cylinder G, upon which rests the fertilizer. The teeth of said cylinder catch into the same, and carry it through between the teeth of segment P, by which means it is, to a great extent, pulverized and delivered into box S, wherefrom it may be delivered, as before stated, in a continuous drill or in spots by the means described; and at the same time it may be ground fine or coarse, as desired, by the proper adjustment of segment P by means of hand-wheel M.

I do not claim, separately, as new any of the devices which I employ to produce the result of pulverizing and distributing fertilizers, as I am aware that many of the same have been employed in the form of mechanical movement for a variety of purposes; but What I do claim as my invention, and desire to secure by Letters Patent of the United States, is—

1. The combination of the cylinder G and teeth H with the segment P and teeth I, shaft J, worm-wheel O and worm N, shaft K, and hand-wheel M, all as operated and arranged, for the purpose above described.

2. The combination of the shaft D with shaft B by means of bevel-gear wheels E and F, the cams U″, the rod V, crank W, shaft 8, valve T, situated in box S, and spring 9, all as arranged, for the purpose above set forth.

JOHN W. YORK.

Witnesses:
  JAMES G. MINER,
  ROBERT M. FRYER.